(12) United States Patent
Degen

(10) Patent No.: US 7,401,547 B2
(45) Date of Patent: Jul. 22, 2008

(54) BALE SET-DOWN SYSTEM

(75) Inventor: Peter Degen, Sassenberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 293 days.

(21) Appl. No.: 11/145,894

(22) Filed: Jun. 6, 2005

(65) Prior Publication Data

US 2006/0086263 A1    Apr. 27, 2006

(30) Foreign Application Priority Data

Jun. 9, 2004   (DE) .................. 10 2004 027 895

(51) Int. Cl.
| | | |
|---|---|---|
| B30B 15/26 | (2006.01) | |
| A01D 41/127 | (2006.01) | |
| A01B 69/00 | (2006.01) | |

(52) U.S. Cl. .............. 100/43; 100/35; 100/87; 56/10.2 R; 56/10.2 F; 56/341; 701/50; 701/213

(58) Field of Classification Search ............ 100/35, 100/45, 87, 88, 89, 100, 188 R, 43; 56/10.2 A, 56/10.2 R, 10.2 F, 341, 344, 350, 354, 474, 56/475; 701/50, 213
See application file for complete search history.

(56) References Cited

U.S. PATENT DOCUMENTS

| 2,453,384 | A | * | 11/1948 | Renken ................... 56/475 |
| 4,115,984 | A | * | 9/1978 | Simpson ................. 56/13.5 |
| 4,214,428 | A | * | 7/1980 | Caraway .................. 56/341 |
| 6,525,276 | B1 | * | 2/2003 | Vellidus et al. ........... 177/136 |

FOREIGN PATENT DOCUMENTS

| DE | 25 56 896 | 6/1978 |
| DE | 689 06 068 | 8/1993 |
| EP | 0 771 522 | 5/1997 |
| GB | 1 549 898 | 8/1979 |

OTHER PUBLICATIONS

Wild et al., Automatic Data Acquisition on Round Balers, Dec. 13-16, 1994, ASAE Paper No. 94-1582.*

* cited by examiner

*Primary Examiner*—Jimmy T Nguyen
(74) *Attorney, Agent, or Firm*—Michael J. Striker

(57) ABSTRACT

A bale set-down system and method for setting down bales from an agricultural baling press onto a field includes placing down of at least one bale on a ground, and setting down at least one another bale in a direct vicinity of the first mentioned bale that has already been placed on the ground.

26 Claims, 3 Drawing Sheets

BALE SET-DOWN SYSTEM

CROSS-REFERENCE

The invention described and claimed hereinbelow is also described in DE 10 2004 027 8954, filed Jun. 9, 2004. This German Patent Application, whose subject matter is incorporated here by reference, provides the basis for a claim of priority of invention under 35 U.S.C. 119(a)-(d).

BACKGROUND OF THE INVENTION

The present invention relates to a bale set-down system and method for agricultural baling presses.

Conventional agricultural baling presses pick up the crops, such as straw, hay or silage, that have been set down on the ground to form a swath, compress them in the pressing chamber to form a bale, and eject these bales out of the pressing chamber as soon as they are made. As a result, the finished bales are set down randomly on the ground and are distributed around the entire field in a usually complex pattern based on the route the driver selected to pick up the swath.

A block baling press is disclosed in EP 0 771 522 B1 that includes a set-down device for setting the bales down in a gentle manner having a multiple-component design and located in a rear region of the block baling press. The bales are set down immediately after the finished bale is tied.

Publication DE 26 56 896 shows a round baling press designed as a fixed chamber compactor. In this case, the finished round bale is set down after a predetermined bale density is reached and the round bale has then been rolled up.

Finally, publication DE 689 06 068 T2 discloses a round baling press designed as a belt press. With this type of baling press, the bales are set down on the field as soon as the tying procedure is started and the predetermined bale size is reached. Unlike the bale density, the size of the bale itself is variable.

None of these agricultural baling presses offers the possibility of setting down bales in a systematic, spacially uniform manner. Instead, the particular bale is set down on the ground, having been ejected out of the compaction space, immediately after it is tied. As a result, the subsequent bale collecting procedure and removal of the bales is complicated and time-intensive.

SUMMARY OF THE INVENTION

Accordingly, it is an object of the present invention to provide a system and a method for setting down bales formed by an agricultural baling press, which avoid the disadvantages of the prior art.

More particularly, it is an object of the present invention to create a system and a method for setting down bales formed by an agricultural baling press that creates an optimal bale set-down path based on different working parameters and, as a function thereof, sets down a plurality of bales in the immediate vicinity of each other.

In keeping with these objects and with others which will become apparent hereinafter, one feature of the present invention resides, briefly stated in a bale set-down system for setting down bales from an agricultural baling press onto a field, the system comprising means for setting down at least one bale in a direct vicinity of at least one bale that has already been placed on a ground.

Another feature of the present invention resides, briefly stated, in a method of setting down bales from an agricultural baling press onto a field, comprising the steps of setting down at least one bale on a ground; and setting down at least another further bale in a direct vicinity of said at least one bale that has already been placed on the ground.

Due to the fact that the bale set-down system sets down at least one bale in the immediate vicinity of a bale that has already been set down on the ground, the time and costs associated with harvesting the bales are optimized by the fact that the set-down bales are located directly next to each other, since the routes that must be covered to remove the bales are shortened considerably.

Given that the bale set-down system carries out a dynamic adaptation of the bale set-down path within a field, different fundamental and harvesting conditions such as a non-uniformly deposited swath can be incorporated in the calculation of the bale set-down path, thereby enabling the optimal bale set-down path to always be calculated as a function of the current and actual field conditions.

The setting-down of the bales in bale corridors or in bale groups enables the bales to be removed quickly from the field, since, using this method, the bales are set down close to each other, regardless of the shape of the field.

The width of the bale corridor and the expansion of the bale groups is determined by the bale set-down path established by the bale set-down system, so the bale corridors are kept as narrow as possible and the expansion of the bale groups is kept to a minimum, thereby ensuring relatively fast removal of the bales.

To support the determination of the optimal bale set-down path, the bale set-down path can be determined as a function of limiting values, whereby the limiting values are the bale geometry, the bale density and/or the surface structure of the field. The set-down point in time can be determined by changing the bale density and bale geometry, enabling a bale to be set down earlier to obtain an optimal set-down point within a bale group or within a bale corridor. The length of the bale set-down path also changes as a function thereof.

Given that the limiting values can be edited, continually changing harvesting conditions can be given adequate consideration. For example, moist crops can be compressed more than dry crops; this affects the bale forming process and must be taken into account when harvesting the bales.

The transport routes within a field are shortened further by the fact that a bale collecting device is assigned to the baling press and the bale collecting device is emptied in the bale corridors and/or in the bale groups. This method results in shorter transport routes since a plurality of bales is set down one on top of the other and longer paths can be covered without setting down a bale.

Different parameters can be used to more accurately calculate the bale set-down path. In particular, data such as the amount of swath set down on the ground, the location of a bale that has already been set down, yield and field mapping data and/or the ground level of the field are incorporated directly in the planning of the bale set-down path, so that the bale set-down system calculates the location where the bale is set down as a function of these parameters. By detecting the ground level of the field in particular, a situation is prevented in which, e.g., a round bale is set down in a place that is determined via calculation to be optimal, but the bale rolls away after it is set down due to the slope or unevenness of the ground.

The job of the driver of the tractor that pulls the baling press is made easier since the bales are set down automatically. The driver is also able to intervene in the set-down mode at any time to make corrections and, in this manner, to manually initiate a setting-down that is suitable to him.

Bales are set down in an efficient and uniform manner around the entire field due to the fact that at least one transmitting unit and one receiving unit for providing field-specific data are assigned to the bale set-down system, whereby the bale set-down system determines the bale set-down path as a function of the data stored in the receiving unit and stores the positions of the bales that were set down.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
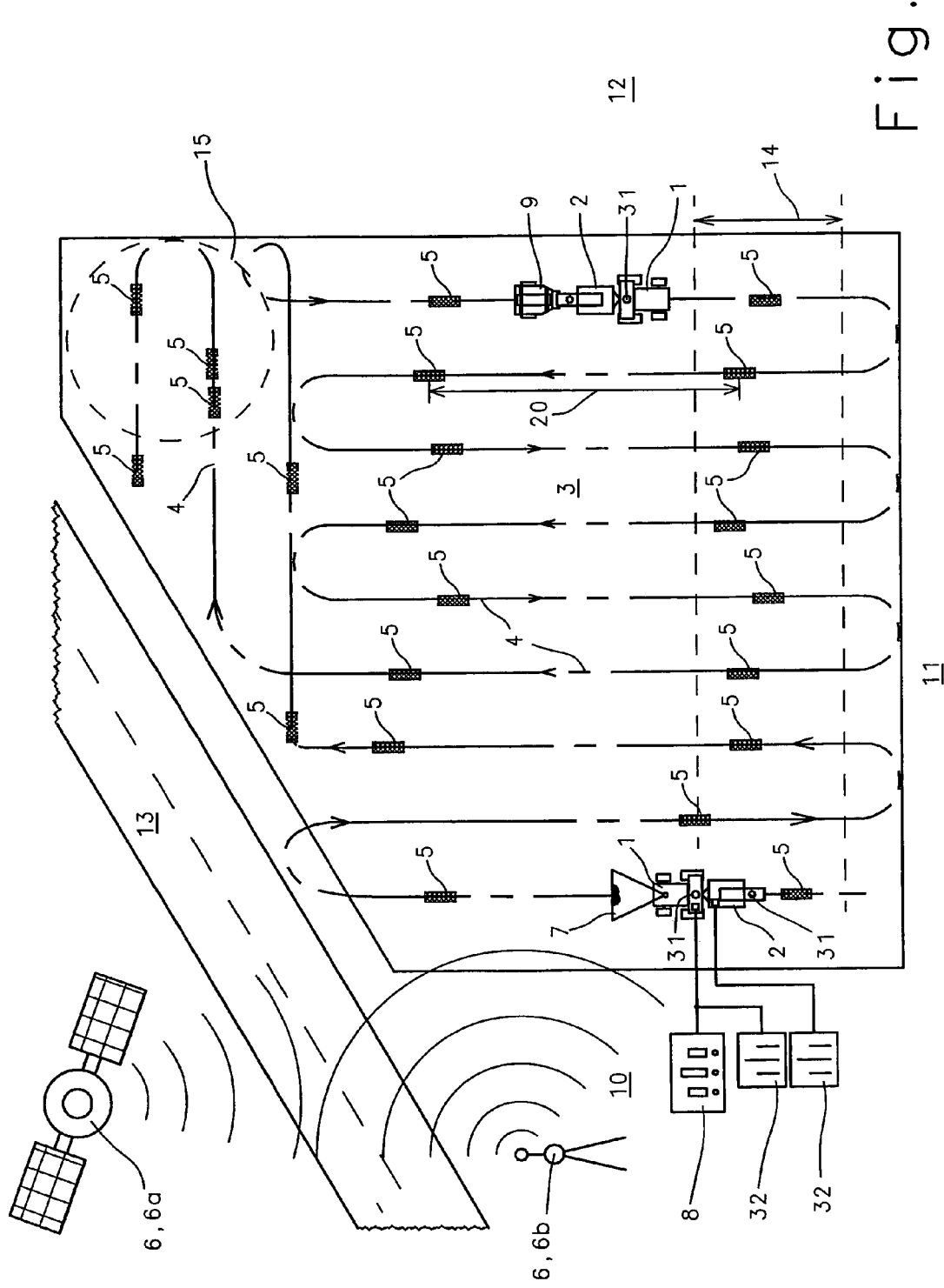
FIG. 1 shows a schematic illustration of a harvesting route and a bale set-down path in accordance with the present invention.

FIG. 1 shows a schematic illustration of the harvesting route of an agricultural baling press 2 adapted for use with a tractor 1. The driving route of the baling press 2 is indicated by dashed lines in the direction of the arrows. Baling press 2, which can be designed as a round or block baling press, picks up swath 4 that has been set down on the field 3 and forms it into a bale 5. Pressed bale 5 is then set down on ground 3.

A field 3, as shown in FIG. 1, is usually many hundreds of meters wide and long. For this reason, a great deal of time is required to collect bales 5 distributed around the entire field 3 and to set them down next to or on top of each other for removal. To avoid this additional effort, the bale set-down system according to the present invention makes it possible to set bales 5 down in the direct vicinity of each other while they are harvested. To enable this, bales 5 are set down within a bale corridor 14 or in a plurality of coordinated bale groups 15. The width of bale corridor 14 and the expansion of bale groups 15 depend on the optimal bale set-down path determined by the bale set-down system, whereby the bale set-down system itself can be determined as a function of defined limiting values. The limiting values are the bale geometry and/or bale density, whereby the bale geometry includes the bale diameter, bale cross-section and/or bale length. Bale corridor 14 is laid out according to these limiting values.

To ensure an efficient harvesting route, it is also important to know and establish the start of the harvesting route on field 3, the driving direction and sequence in which swath 4 is picked up. For this purpose, tractor 1 and/or baling press 2 must be supplied with the data required for this, such as field size (field length and width) or amount of swath, location of swath 4, location of a bale 5 that has already been set down, or the ground level of field 3.

Since the swath is set down on field 3 during the harvesting travel using a combine harvester in a generally-known manner in which the crop stalks are pushed out of the rear region of the combine harvester after threshing by the combine harvester and set down directly on the ground, the data on the course of swath 4 and the amount of swath can be determined during the harvesting travel. To accomplish this, an electronics system integrated in the combine harvester stores the harvesting route of the combine harvester. The course of swath 4 set down on ground 3 can be determined based on the harvesting route of the combine harvester. These data are stored and made available to the bale set-down system. In addition, the yield mapping data can be stored in a terminal 8, so that all concrete, field-specific data and the position of field 3 relative to other adjacent fields 10, 11, 12 or public roads 12 can be called up.

Based on the mapped yield amount, determinations can be made about the amount of swath set down on the ground, so that the amount of swath that has not yet been processed and is located in front of tractor 1, and the position of swath 4 in field 3 is known. In addition, control of tractor 1 or press 2 as a function of signals 6a from a GPS system 6 or a stationary transmitting unit 6b is feasible.

All data are implemented directly in the planning of ball set-down path 20. The system therefore recognizes at which point in time and at which point in field 3 the next bale 3 should be set down. In addition, a GPS position is assigned to each bale 5 that is set down. A driving route is created based on the next point in time and the next place for a bale to be set down, with the requirement that as many bales 5 as possible be set down in the direct vicinity of each other.

In this manner, specified bale set-down path 20 determines the width of bale corridor 14 and the expansion of bale groups 15 on field 3.

It is further feasible to determine the field data using other devices. For instance, swath 4 that has been set down in front of tractor 1 can be detected and evaluated using a generally known laser scanning system 7. The course of swath 4 determined in this manner is implemented as a further parameter in the calculation of the optimal bale set-down path 20. Accordingly, a suitable software program calculates the driving path to be covered to press a bale 5 based on swath 4 currently located in front of tractor 1. This means that, if it is determined via calculation that, to create a bale 5, a certain driving path must be covered to pick up swath 4 set down there, the bale set-down system defines this driving route as a ratio of the specific field size.

Depending on the ratio of field size and swath amount to the driving path that was determined, the bale set-down system creates a bale set-down path 20. Thereby the driving path to be covered to press a bale 5 and the swath amount to be picked up along this driving route are used to calculate the optimal bale set-down path 20, so that the bale set-down system determines the position where bales 5 are to be set down and, based on this, calculates the set-down position for bales 5 in the immediate vicinity of each other.

If it happens that bales 5 are not set down in the immediate vicinity of each other due to the predetermined bale size, this is brought to the driver's attention via terminal 8 located in tractor 1.

If it happens that the driving route to the next bale 5 that was set down on field 3 is too short for another bale 5 to be set down in the immediate vicinity, and this bale 5 would therefore not be set down until a later point in time and necessarily further from bale 5 that was already set down, the driver also has the option of intervening in established bale set-down path 20 to make a correction. The driver accomplishes this by manually initiating the early tying and setting-down of a smaller bale 5, so that bale 5 can be placed in the vicinity of other bales 5.

The bale set-down system can also be designed, however, such that the system automatically detects when it would be favorable to set down a bale, so that the early setting-down of bale 5 can be automatically initiated.

If the driver makes a correction to bale set-down path 20, the bale set-down system stores this change and takes it into account in the further planning of bale set-down path 20.

The position and width of bale corridor 14 and the position and expansion of bale groups 15 is determined by bale set-down path 20 defined by the bale set-down system, whereby the intention is to keep the corridor width and expansion of the bale group small.

To determine optimal bale set-down path 20, bale set-down path 20 can be determined as a function of limiting values, such as the bale geometry and bale density, whereby the bale geometry includes bale diameter, bale cross-section and bale length. The point in time at which a bale 5 is completed and, therefore, the set-down location, can be determined by changing the bale density or bale geometry during the pressing process in order to thereby establish a direct assignment to a bale 5 that has already been set down, even if the pressing procedure to create a predefined bale 5 of a certain size has not yet ended.

The bale density, bale diameter, bale cross-section and bale length are adjustable depending on the design of the baling press.

Figure 2:
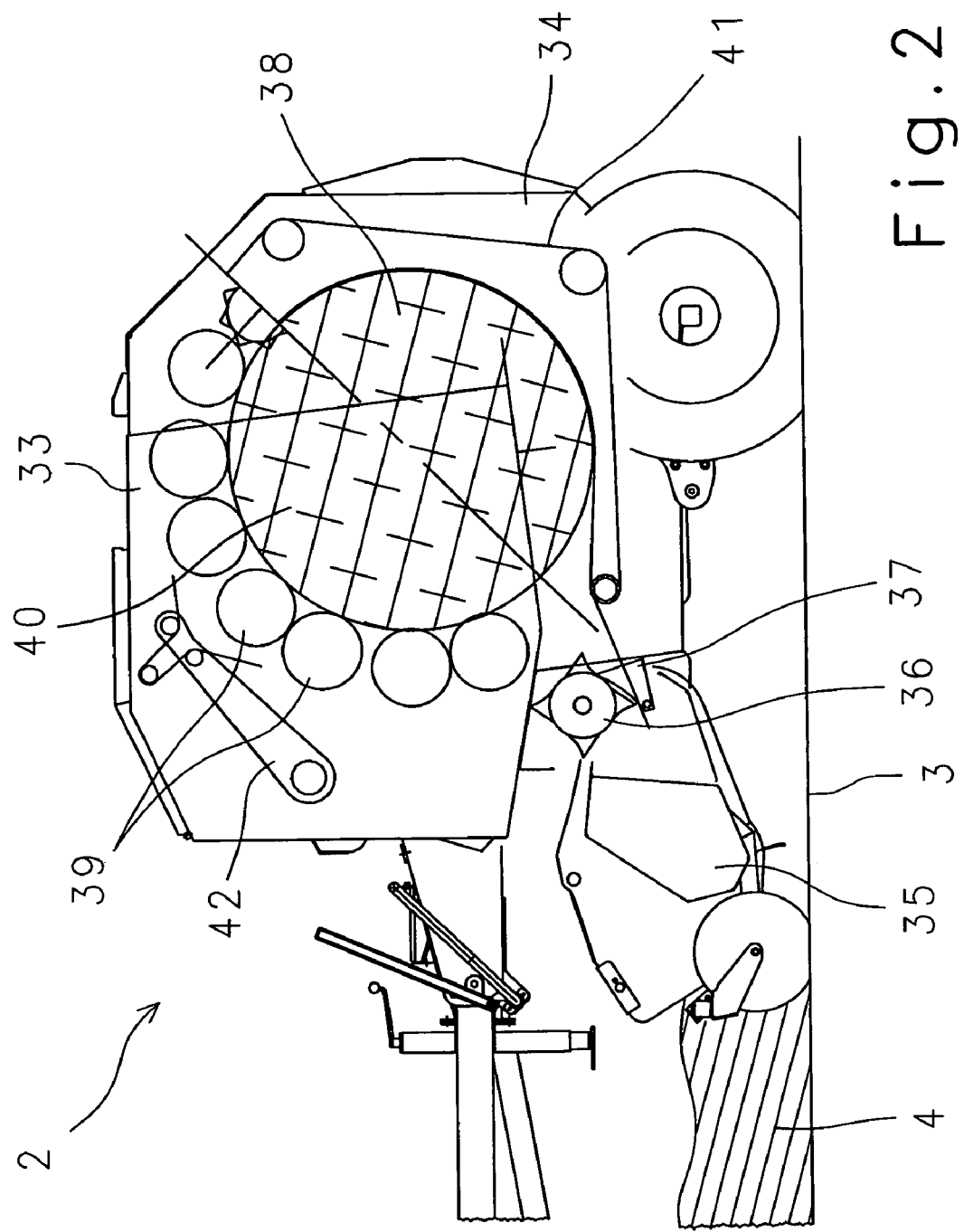
FIG. 2 shows a side sectional view of a fixed chamber round baling press and a belt round baling press in accordance with the present invention.

FIG. 2 shows a side view of a partial cross-section of a fixed chamber baling press 33 and a belt round baling press 34. Baling press 2, 33, 34 uses a pick-up device 35 to lift swath 4 from field 3 and conveys the pressing material past a cutting rotor 36 and cutting knives 37 to bale space 38.

Bale space 38 of fixed chamber press 33 is surrounded on its circumference by bale shaping elements 39, which are in the shape of cylindrical rollers in this case. Bale shaping elements 39 are rotatably supported and driven. Since ball shaping elements 39 are fixed in position, the size of round bale 40 cannot be changed. The bale density can be changed by changing the bale pressure, however, so that, to shape a bale 40 with a greater bale density and a predetermined weight of, e.g., 800 kg, a longer driving route for picking up the swath can be covered than for a bale 5 with a predetermined weight of 700 kg.

In contrast to fixed chamber press 33, the bale diameter can be changed when a belt press 34 is used. Pressing space 38 of belt press 34 is surrounded on its circumference by endless belts 41 that are controlled by a swivel arm 42, whereby belts 41 yield to the pressure from growing bale 40 during the rolling procedure. Belts 41 themselves are driven and surround the pressing material as soon as it is fed into bale chamber 38. A bale 40 is therefore formed at an early point in time using a constant belt tension and, therefore, with a bale density that is unchangeable. For this reason, it is possible to shape variable bales 40 having a different bale diameter and nearly the same bale density and to set them down at any time onto field 3 after they are tied.

As a result, bale set-down path 20 can be designed with great flexibility in terms of the layout of bale corridor 14, since the point in time for tying and setting down bale 40 can be determined at any time.

Figure 3:
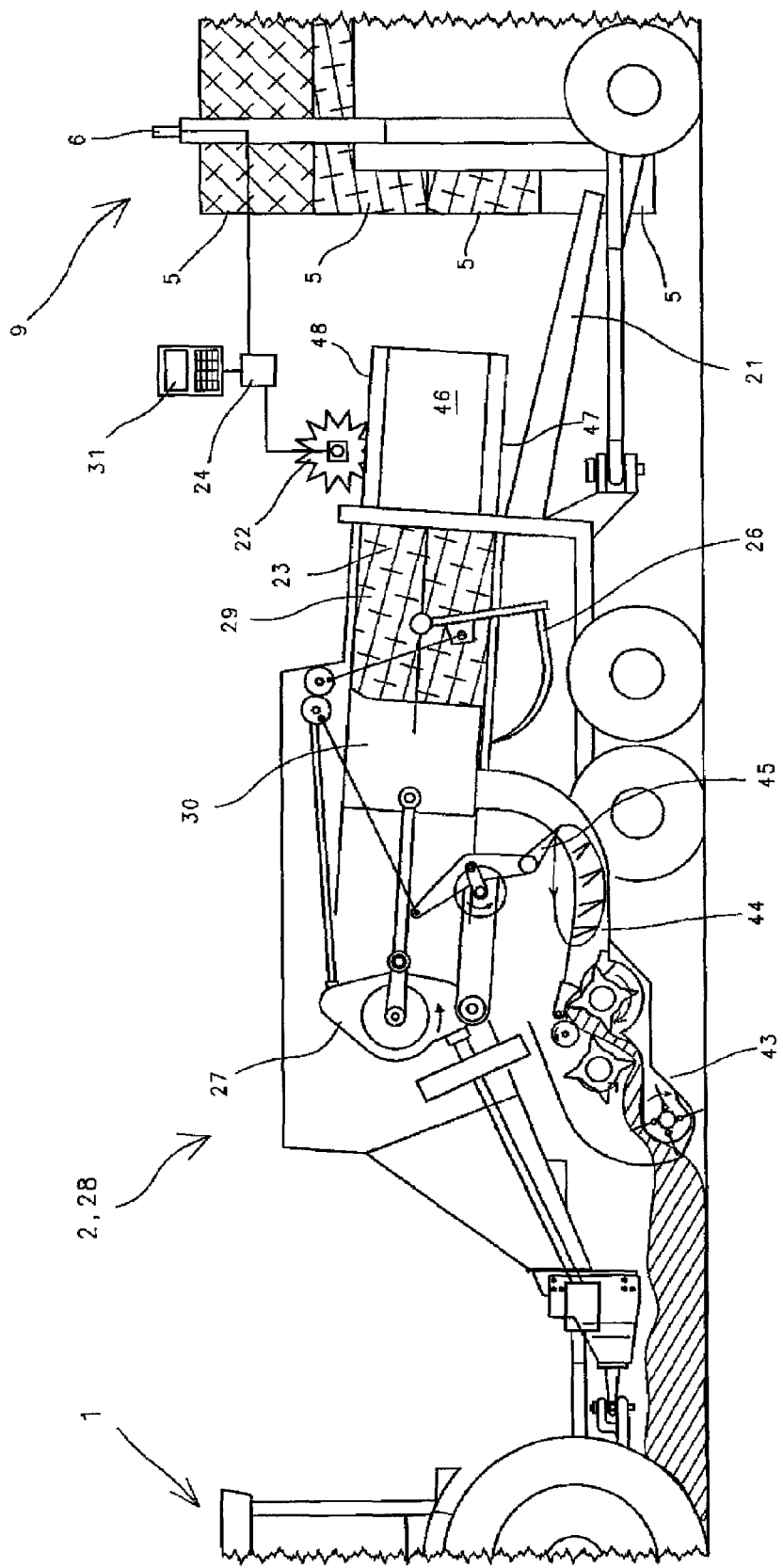
FIG. 3 shows a side view of a block baling press with a bale collecting device adapted for use with a tractor in accordance with the present invention.

FIG. 3 shows a block baling press 28 with a bale collecting device 9 adapted for use with a tractor. The bale geometry and bale density can be changed with block baling press 28.

The fodder material is first conveyed via pick-up device 43 into feed channel 44, in which the fodder material is pre-compressed by reaping teeth 45 and conveyed via a loading stroke into baling channel 29. In baling channel 29, fodder material 23 is acted upon by a reciprocating plunger 30 and compressed to form bale 5.

The length of bale 5 formed in baling channel 29 can be determined via a straw wheel 22 integrated in baling chute 21. To determine the length of fodder material 23, the tips of straw wheel 22 penetrate bale 5 located below them, and bales 23 drive straw wheel 22 by way of its motion.

The length of bale 23 is detected by straw wheel 22 in this manner. Straw wheel 22 is connected with evaluation electronics 23 that receive the length pulses from straw wheel 22 and add them up to obtain an actual length value of the fodder material "log" 23. If the actual length value now reaches a value that corresponds to an optimal bale set-down point within a bale set-down path 20, evaluation electronics 24, using a signal, activates a coupling (not shown) that couples binding device 25 with the knot-binding device and binding needle 26 in a driving manner with main gearbox 27. Binding needle 26 moves the lacing twine through the fodder material "log" to the knot-binding device, where fodder material "log" 23 is bound and cut to form a finished block bale 23. Longer or shorter bales 23 are bound and set down in this manner.

In addition, it can be determined, as a function of the result of the bale length measurement, how much distance was actually covered to press this bale 23, and how much total distance is required to press a bale 5. This value can be incorporated as a parameter in the further calculation of bale set-down path 20. This ensures that bale set-down path 20 is calculated in a dynamic manner, so that swath amounts that were set down in a non-uniform manner do not have a negative affect on the calculation.

To ensure greater flexibility in the setting-down of the bales, the driver of tractor 1 can intervene in the bale set-down mode using an input device 31 to make corrections and determine the point in time and place for bale 23 to be set down and/or to determine the width of bale corridor 14 or the expansion of bale group 15.

In addition, the density of block bale 23 can be increased by way of movable side walls 46, a movable baling chamber base 47 or baling chamber cover 48 in that these components 46, 47, 48 are moved into baling channel 29 and act against bale 23 during the pressing action. The width and height of block bale 23 are also reduced as a result.

Within the framework of the present invention, it is also feasible to attach a generally known bale collecting device 9 to block baling press 28. Bale collecting device 9 takes pressed bales 5 directly from block baling press 28 without their being set down on the ground. Bale collecting device 9 can accommodate a plurality of bales 5 simultaneously and stack the bales one on top of the other. Once bale collecting device 9 is filled with bales 5, bales 5 are set down on ground 3 in stacks. Bale collecting devices 9 are known that accommodate up to four bales 5 and stack the bales one on top of the other.

By connecting bale collecting device 9 to a block baling press 28, it is possible to set down bales 5 in an even more optimal manner, by emptying bale collecting device 9 in bale corridor 14 or bale groups 15. The number of bale setting-down points on field 3 is reduced in this manner, since a plurality of bales 5 is stacked one on top of the other and a longer driving route overall can be covered without setting any bales down. As a result of the flexibility created by the ability to accommodate a plurality of bales 5, the bale set-down system can calculate a bale set-down path 20 on which between 1 and 4 bales can be set down at one point based on the example of a total of four bales 5 being accommodated. This means that, if the system recognizes, based on the actual amount of swath yet to be picked up and the number of bales 5 actually accommodated in bale collecting device 9, that a bale must be set down at the next possible point in time, i.e., within bale corridor 14 or bale group 15, then bale collecting device 9 is emptied.

The different number of bales 5 that can be set down within a bale set-down corridor 14 can result from the different width or length of field 3 and the different amounts of swath. The bale set-down system processes this data and notes the positions and total number of bales 5 already set down on field 3. As a function thereof, bale groups 15 and/or bale corridors 14 are formed at the suitable collection points within bale set-down path 20, to thereby ensure a uniform setting-down of bales on field 3, which simplifies the removal of bales 5.

An essential advantage of harvesting using a bale collecting device 9 is that bales 5 collected in bale collecting device 9 have the identical bale geometry. At least three homogeneous bales 5 can therefore be pressed and deposited in bale collecting device 9 before the fourth bale 5—provided this is required per the planned bale path 20—is bound before its optimum size is reached and is then set down with the other three bales 5.

The loading volume of the harvesting wagon can be used as a further parameter for the formation of bale groups 15 or bale set-down corridors 14. The holding capacity of the harvesting wagon therefore determines the number of bales 5 to be set down in one bale group 15.

One skilled in the art is capable of transferring the invention described here using the example of bailing presses to any agricultural working or harvesting machines designed to harvest piece-wise fodder material and set it down in appropriate places, as is also the case with beetroot extractors.

It will be understood that each of the elements described above, or two or more together, may also find a useful application in other types of constructions and methods differing from the types described above.

While the invention has been illustrated and described as embodied in a bale set-down system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A bale set-down system for setting down bales from an agricultural baling press onto a field, the system comprising means for setting down at least one bale in a direct vicinity of at least one bale that has already been placed on a ground, wherein said means is formed so as to provide dynamic adaptation of a bale set-down path on the field, wherein said means is formed so that the bales are set down in a manner selected from the group consisting of setting down within a bale corridor, setting down in bale groups, and both, and wherein said means is operative so that a width of the bale corridor and an expansion of the bale groups depends on a bale path; and further comprising at least one transmitting unit and at least one receiving unit for receiving data, so that said means determine a bale set-down path as a function of data stored in said receiving unit and stores positions of the set-down bales.

2. A bale set-down system as defined in claim 1, wherein said means is formed so that a bale set-down path depends on limiting values.

3. A bale set-down system as defined in claim 2, wherein said means is formed so that the bale set-down path depends on limiting values which include a value selected from the group consisting of a bale geometry, a bale density, and both.

4. A bale set-down system as defined in claim 3, wherein said means is formed so that the bale geometry includes a value selected from the group consisting of a bale diameter, a bale cross-section, a bale length, and combinations thereof.

5. A bale set-down system as defined in claim 1, wherein said means is formed so that the limiting values are capable of being edited.

6. A bale set-down system as defined in claim 1; and further comprising a bale collecting device assigned to the baling press, which is emptied in a manner selected from the group consisting of emptying in bale corridors, emptying in bale groups, and both.

7. A bale set-down system as defined in claim 1, wherein said means is formed so that a bale set-down path is determined as a function of different parameters.

8. A bale set-down system as defined in claim 7 wherein said means is formed so that the bale set-down path is determined as a function of different parameters selected from the group consisting of an amount of swath set down on the ground, a location of the swath, a location of a bale that has already been set down, yield data, field mapping data, a ground level of a field, and combinations thereof.

9. A bale set-down system as defined in claim 7, wherein said means is formed so that the bales are set down automatically or manually depending on the parameters.

10. A bale set-down system as defined in claim 1, wherein said transmitting unit is a unit selected from the group consisting of a GPS satellite, a stationary transmitting unit, and both.

11. A bale set-down system as defined in claim 1, wherein said receiving unit is formed as a device selected from the group consisting of a receiving unit for signals selected from the group consisting of GPS signals, stationary signals, and both, and a terminal with stored field data.

12. A bale set-down system as defined in claim 1, wherein said receiving unit is located on a device selected from the group consisting of a tractor, a baling press, a bale collecting device, and combinations thereof.

13. A bale set down system as defined in claim 1, wherein said means is formed so as to determine a length and course of a bale set-down path.

14. A method of setting down bales from an agricultural baling press onto a field, comprising the steps of setting down at least one bale on a ground; setting down at least another further bale in a direct vicinity of said at least one bale that has already been placed on the ground, wherein said setting down include dynamic adaptation of a bale set down path on a field, and setting down the bales in a manner selected from the group consisting of a setting down within a bale corridor, a setting down in bale groups, and both; assigning at least one transmitting unit and receiving unit for receiving data; determining a bale set-down path as a function of data stored in the receiving unit and storing positions of the set-down bales; and selecting a width of the bale corridor and expansion of the bale groups depending on a bale path.

15. A method as defined in claim 14; and further comprising selecting a bale set-down path depending on limiting values.

16. A method as defined in claim 15; and further comprising using as the limiting values a value selected from the group consisting of a bale geometry, a bale density, and both.

17. A method as defined in claim 16; and further comprising using as the bale geometry a parameter selected from the group consisting of a bale diameter, a bale cross-section, a bale length and a combination thereof.

18. A method as defined in claim 15; and further comprising editing the limiting values.

19. A method as defined in claim 14; and further comprising assigning a bale collecting device to a baling press; and emptying the bale collecting device in a manner selected from the group consisting of emptying in a bale corridor, emptying in bale groups, and both.

20. A method as defined in claim 14; and further comprising determining a bale set-down path as a function of different parameters.

21. A method as defined in claim 20; and further comprising using as the parameters a parameter selected from the group consisting of an amount of swath set down on the ground, a location of the swath, a location of the bale that has already been set down, yield data, field mapping data, a ground level of a field, and combinations thereof.

22. A method as defined in claim 21; and further comprising setting down the bales in a manner selected from the group consisting of automatically and manually, depending on the parameters.

23. A method as defined in claim 14; and further comprising using as the transmitting unit a unit selected from the group consisting of a GPS satellite, a stationary transmitting unit, and both.

24. A method as defined in claim 14; and further comprising using as the receiving unit a receiving unit for GPS signals, a receiving unit for stationary signals, and a terminal for store field data.

25. A method as defined in claim 14; and further comprising arranging the receiving unit on a device selected from the group consisting of a tractor, a baling press, a bale collecting device and combinations thereof.

26. A method as defined in claim 14 and further comprising determining a length and course of a bale set-down path.

* * * * *